(12) United States Patent
Xu et al.

(10) Patent No.: US 10,523,107 B2
(45) Date of Patent: *Dec. 31, 2019

(54) CONTROL CIRCUIT FOR VOLTAGE REGULATOR WITH SLEW RATE CONTROLLED REFERENCE SIGNAL GENERATING AND ASSOCIATED METHOD

(71) Applicant: Chengdu Monolithic Power Systems Co., Ltd., Chengdu (CN)

(72) Inventors: Binci Xu, Hangzhou (CN); Lijie Jiang, Hangzhou (CN); Chao Liu, Sunnyvale, CA (US); Tao Zhao, San Jose, CA (US)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/984,306

(22) Filed: May 18, 2018

(65) Prior Publication Data

US 2018/0337589 A1   Nov. 22, 2018

(30) Foreign Application Priority Data

May 22, 2017   (CN) .......................... 2017 1 0363235

(51) Int. Cl.
*H02M 3/156* (2006.01)
*H02M 1/14* (2006.01)
(Continued)

(52) U.S. Cl.
CPC ............... *H02M 1/14* (2013.01); *H02M 3/04* (2013.01); *H02M 3/156* (2013.01); *H02M 2001/0025* (2013.01); *H02M 2001/0048* (2013.01)

(58) Field of Classification Search
CPC .. H02M 2001/0025; H02M 3/04; H02M 1/14; H02M 2001/0048; H02M 3/1588; H03K 3/012; H03K 3/017
See application file for complete search history.

(56) References Cited

U.S. PATENT DOCUMENTS

| 8,791,676 B2* | 7/2014 | Liu ......................... G06F 1/266 323/282 |
| 2007/0300082 A1* | 12/2007 | Muraki ..................... G06F 1/04 713/300 |

(Continued)

OTHER PUBLICATIONS

RT8817A ("Dual-Phase PWM Controller with PWM-VID Reference," Datasheet, Richtek Technology Corporation, Sep. 2016) (Year: 2016).*

(Continued)

*Primary Examiner* — Alex Torres-Rivera
*Assistant Examiner* — Jye-June Lee
(74) *Attorney, Agent, or Firm* — Perkins Coie LLP

(57) ABSTRACT

A method for controlling a voltage regulator is receiving a voltage identification code which has a pulse width modulation signal, providing a duty signal via measuring a duty cycle of the pulse width modulation signal, calculating a target voltage based on the duty signal, providing a reference signal based on the duty signal and the target voltage. If it is judged that the duty cycle of the pulse width modulation signal increases, the reference signal is restricted increasing or keeping its value without decreasing, and if it is judged that the duty cycle of the pulse width modulation signal decreases, the reference signal is restricted decreasing or keeping its value without increasing.

19 Claims, 8 Drawing Sheets

(51) Int. Cl.
   *H02M 3/04*      (2006.01)
   *H02M 1/00*      (2006.01)

(56) References Cited

U.S. PATENT DOCUMENTS

| | | | | |
|---|---|---|---|---|
| 2013/0049720 | A1* | 2/2013 | Nien | H02M 3/1588 |
| | | | | 323/271 |
| 2017/0288648 | A1* | 10/2017 | Tang | H03K 3/012 |
| 2018/0337585 | A1* | 11/2018 | Xu | H02M 3/1588 |

OTHER PUBLICATIONS

U.S. Appl. No. 15/383,892, filed Dec. 19, 2016, Jeff.
U.S. Appl. No. 15/842,797, filed Dec. 14, 2017, Suhua.

\* cited by examiner

CONTROL CIRCUIT FOR VOLTAGE REGULATOR WITH SLEW RATE CONTROLLED REFERENCE SIGNAL GENERATING AND ASSOCIATED METHOD

CROSS-REFERENCE TO RELATED APPLICATION

This application claims the benefit of CN application No. 201710363235.0, filed on May 22, 2017, and incorporated herein by reference.

TECHNICAL FIELD

The present invention relates to electrical circuit, more particularly but not exclusively relates to control circuit for voltage regulator and associated method.

BACKGROUND

In a computer system, an operating voltage of a processor needs to be adjusted to accommodate different operating mode. The processor comprises Central Processing Unit (CPU) and Graphic Processing Unit (GPU) for example. Generally, a voltage regulator is employed to adjust the operating voltage based on a voltage identification (VID) code from the processor.

The voltage regulator provides a reference signal based on the voltage identification code, and the voltage regulator converts an input voltage to an output voltage based on the reference signal. The output voltage is used as the operating voltage of the processor. The voltage identification code may have a pulse width modulation signal compatible with an NVIDIA processor. However, traditional method to obtain the reference signal from the pulse width modulation signal has a large ripple and jitter, which would increase power loss.

SUMMARY

It is one of the objects of the present invention to provide a method for controlling a voltage regulator and associated control circuit to solve the above problems.

One embodiment of the present invention discloses a method for controlling a voltage regulator, wherein the voltage regulator is configured to provide an output voltage based on a reference signal, the method comprising: receiving a voltage identification code, the voltage identification code comprising a pulse width modulation signal; providing a duty signal via measuring a duty cycle of the pulse width modulation signal; calculating a target voltage corresponding to the voltage identification code based on the duty signal; providing the reference signal based on the duty signal and the target voltage; and providing a switching control signal to control the voltage regulator based on the reference signal and a feedback signal representative of the output voltage; if the duty cycle of the pulse width modulation signal increases, restricting the reference signal increasing or keeping its value without decreasing until the reference signal being in a range determined by the target voltage; and wherein if the duty cycle of the pulse width modulation signal decreases, restricting the reference signal decreasing or keeping its value without increasing until the reference signal being in the range determined by the target voltage.

Another embodiment of the present invention discloses a control circuit for a voltage regulator, wherein the voltage regulator is configured to provide an output voltage based on a reference signal, the control circuit comprising: a reference generating circuit, configured to receive a voltage identification code and provide the reference signal based on the voltage identification code, wherein the voltage identification code comprises a pulse width modulation signal, and wherein if a duty cycle of the pulse width modulation signal increases, the reference signal is restricted increasing or keeping its value without decreasing, and if the duty cycle of the pulse width modulation signal decreases, the reference signal is restricted decreasing or keeping its value without increasing; and a switching control circuit, configured to provide a switching control signal to control the voltage regulator based on the reference signal and a feedback signal representative of the output voltage.

Yet another embodiment of the present invention discloses a method for controlling a voltage regulator, wherein the voltage regulator has a power switch and the voltage regulator is configured to provide an output voltage based on a reference signal, the method comprising: receiving a voltage identification code, the voltage identification code comprising a pulse width modulation signal; providing a duty signal via measuring a duty cycle of the pulse width modulation signal; calculating a target voltage corresponding to the voltage identification code based on the duty signal; providing the reference signal based on the duty signal and the target voltage; and providing a switching control signal to control the power switch based on the reference signal and a feedback signal representative of the output voltage.

BRIEF DESCRIPTION OF THE DRAWINGS

Non-limiting and non-exhaustive embodiments are described with reference to the following drawings.

The use of the same reference label in different drawings indicates the same or like components.

DETAILED DESCRIPTION

In the present application, numerous specific details are provided, such as examples of circuits, components, and methods, to provide a thorough understanding of embodiments of the invention. These embodiments are exemplary, not to confine the scope of the invention. Persons of ordinary skill in the art will recognize, however, that the invention can be practiced without one or more of the specific details. In other instances, well-known details are not shown or described to avoid obscuring aspects of the invention. Some phrases are used in some exemplary embodiments. However, the usage of these phrases is not confined to these embodiments.

Several embodiments of the present invention are described below with reference to a control circuit for a voltage regulator with a reference signal generating and associated method. The control circuit receives a voltage identification code having a pulse width modulation signal and provides the reference signal accordingly. If the voltage identification code varies, it is judged that the reference signal demands dynamic regulation, restricting the reference signal monotone change until the reference signal is in a range determined by a target voltage corresponding to the voltage identification code. For example, if a duty cycle of the pulse width modulation signal increases, it is judged that the reference signal demands dynamic increasing, then the reference signal is restricted monotone increasing until the reference signal is in the range determined by the target voltage, and if the duty cycle of the pulse width modulation signal decreases, it is judged that the reference signal demands dynamic decreasing, then the reference signal is restricted monotone decreasing until the reference signal is in the range determined by the target voltage. "Monotone increasing" means that the reference signal is restricted increasing or keeping its value without decreasing. "Monotone decreasing" means that the reference signal is restricted decreasing or keeping its value without increasing.

Figure 1:
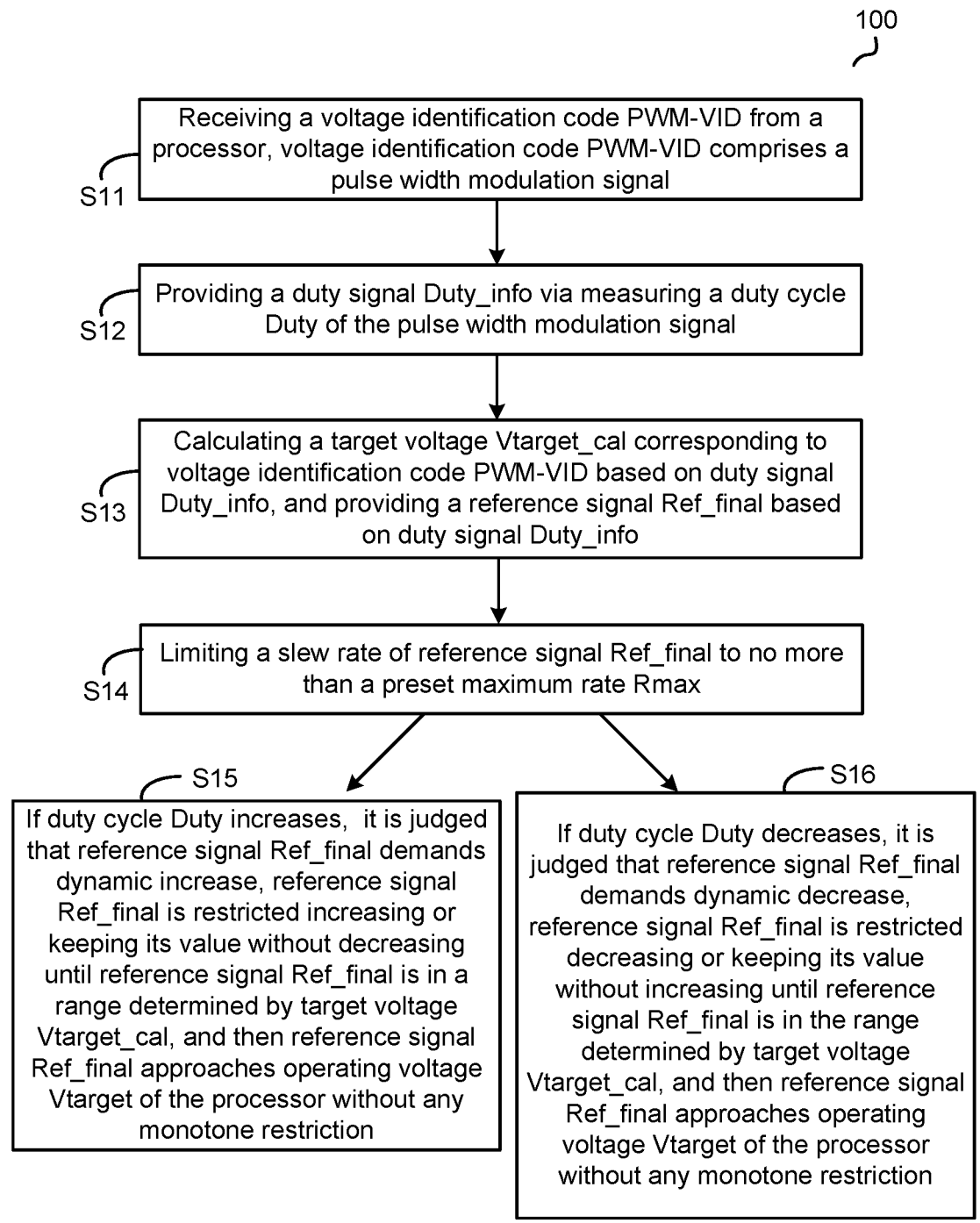
FIG. 1 shows a flow chart 100 illustrating a method for generating a reference signal according to an embodiment of the present invention.

FIG. 1 shows a flow chart 100 illustrating a method for generating a reference signal according to an embodiment of the present invention. The method illustrated by flow chart 100 comprises steps S11-S16. At step S11, receiving a voltage identification code PWM-VID from a processor, voltage identification code PWM-VID comprises a pulse width modulation signal. The pulse width modulation signal with different duty cycle is corresponding to different operating voltage Vtarget of the processor. At step S12, providing a duty signal Duty_info via measuring a duty cycle Duty of the pulse width modulation signal. For example, duty cycle Duty of the pulse width modulation signal is measured by detecting a time period during which the pulse width modulation signal maintains at a high voltage level. At step S13, calculating a target voltage Vtarget_cal corresponding to voltage identification code PWM-VID based on duty signal Duty_info, and providing a reference signal Ref_final based on duty signal Duty_info. People with ordinary skill in the art should know that there is a static error between target voltage Vtarget_cal and operating voltage Vtarget of the processor. At step S14, limiting a slew rate of reference signal Ref_final to no more than a preset maximum rate Rmax. At step S15, if duty cycle Duty of the pulse width modulation signal increases, it is judged that reference signal Ref_final demands dynamic increasing, reference signal Ref_final is restricted increasing or keeping its value without decreasing until reference signal Ref_final is in the range determined by target voltage Vtarget_cal, e.g., reference signal Ref_final is larger than the sum of target voltage Vtarget_cal and a rising threshold up_threshold, and then reference signal Ref_final approaches operating voltage Vtarget of the processor without any monotone restriction. Rising threshold up_threshold is programmable, and is larger than or equal to zero. At step S16, if duty cycle Duty of the pulse width modulation signal decreases, it is judged that reference signal Ref_final demands dynamic decreasing, reference signal Ref_final is restricted decreasing or keeping its value without increasing until reference signal Ref_final is in the range determined by target voltage Vtarget_cal, e.g., reference signal Ref_final is less than the sum of target voltage Vtarget_cal and a falling threshold down_threshold, and then reference signal Ref_final approaches operating voltage Vtarget of the processor without any monotone restriction. Falling threshold down_threshold is programmable, and is larger than or equal to zero.

It should be noted that, in the flow chart described above, the box functions may also be implemented with different orders as shown in FIG. 1. For example, two successive box functions may be executed meanwhile, or sometimes the box functions may be executed in a reverse order.

In one embodiment, if target voltage Vtarget_cal minus reference signal Ref_final is larger than a preset value E1 (Vtarget_cal−Ref_final>E1), or if duty cycle Duty of the pulse width modulation signal increases beyond a predetermined range, it is judged that duty cycle Duty of the pulse width modulation signal increases, and reference signal Ref_final demands dynamic increasing.

In one embodiment, if reference signal Ref_final minus target voltage Vtarget_cal is larger than preset value E1 (Ref_final−Vtarget_cal>E1), or if duty cycle Duty of the pulse width modulation signal decreases beyond the predetermined range, it is judged that duty cycle Duty of the pulse width modulation signal decrease, and reference signal Ref_final demands dynamic decreasing.

In one embodiment, a relationship between operating voltage Vtarget of the processor and duty cycle Duty of the pulse width modulation signal is expressed by following equation (1):

$$V\text{target}=(V\text{max}-V\text{min})*\text{Duty}+V\text{min} \quad (1)$$

Where, Vmax is a value of operating voltage Vtarget when corresponding duty cycle Duty of the pulse width modulation signal is 100%, and Vmin is a value of operating voltage Vtarget when corresponding duty cycle Duty of the pulse width modulation signal is zero.

In one embodiment, target voltage Vtarget_cal increases when duty signal Duty_info increases, and target voltage Vtarget_cal decreases when duty signal Duty_info decreases. For example, target voltage Vtarget_cal can be obtained by following equation (2):

$$V\text{target\_cal}=(V\text{max}-V\text{min})*\text{Duty\_info}+V\text{min} \quad (2)$$

Figure 2:
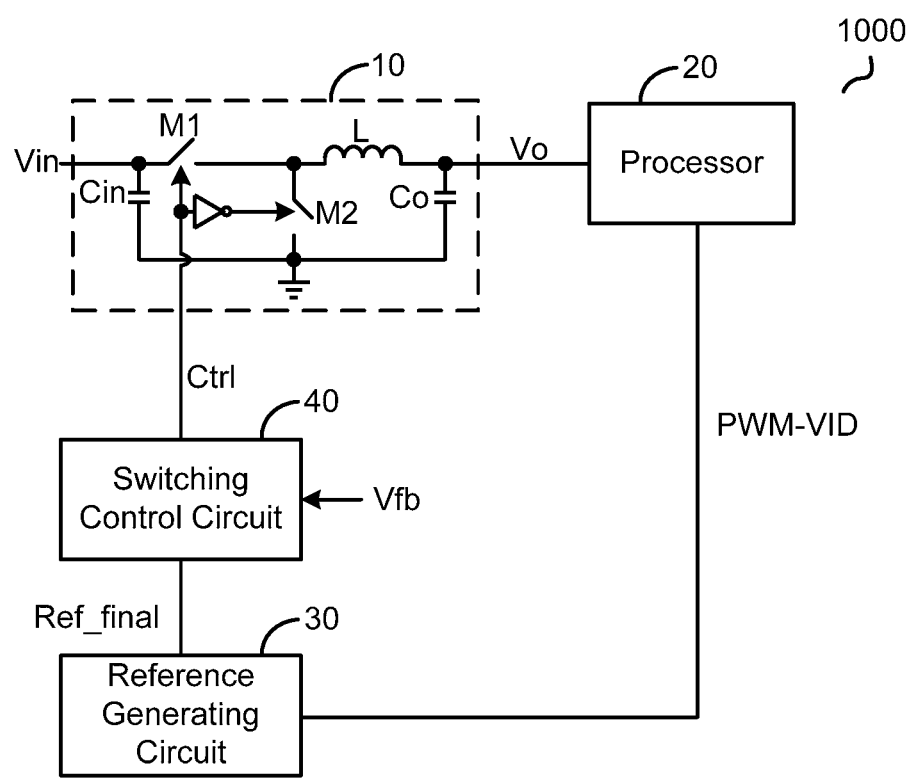
FIG. 2 illustrates a circuit block diagram of a voltage regulator 1000 according to an embodiment of the present invention.

FIG. 2 illustrates a circuit block diagram of a voltage regulator 1000 according to an embodiment of the present invention. Voltage regulator 1000 comprises a switching circuit 10, a control circuit comprising a reference generating circuit 30 and a switching control circuit 40. Switching circuit 10 comprising at least one power switch is configured to convert an input voltage Vin to an output voltage Vo based on reference signal Ref_final. Output voltage Vo is coupled to a processor 20 to provide operating voltage Vtarget. Reference generating circuit 30 is coupled to processor 20 to receive voltage identification code PWM-VID, and is configured to provide reference signal Ref_final based on voltage identification code PWM-VID. In one embodiment, reference generating circuit 30 is configured to provide duty signal Duty_info by measuring duty cycle Duty of the pulse width modulation signal, and is configured to calculate target voltage Vtarget_cal based on duty signal Duty_info, and provide reference signal Ref_final based on duty signal Duty_info and target voltage Vtarget_cal. If duty cycle Duty of the pulse width modulation signal increases, it is judged that reference signal Ref_final demands dynamic increasing, reference generating circuit 30 is configured to restrict reference signal Ref_final monotone increasing until reference signal Ref_final is in the range determined by target voltage Vtarget_cal; and if duty cycle Duty of the pulse width modulation signal decreases, it is judged that reference signal Ref_final demands dynamic decreasing, reference generating circuit 30 is configured to restrict reference signal Ref_final monotone decreasing until reference signal Ref_final is in the range determined by target voltage Vtarget_cal. Switching control circuit 40 is configured to provide a switching control signal Ctrl to control the at least one power switch in switching circuit 10 based on reference signal Ref_final and a feedback signal Vfb representative of output voltage Vo.

Figure 3:
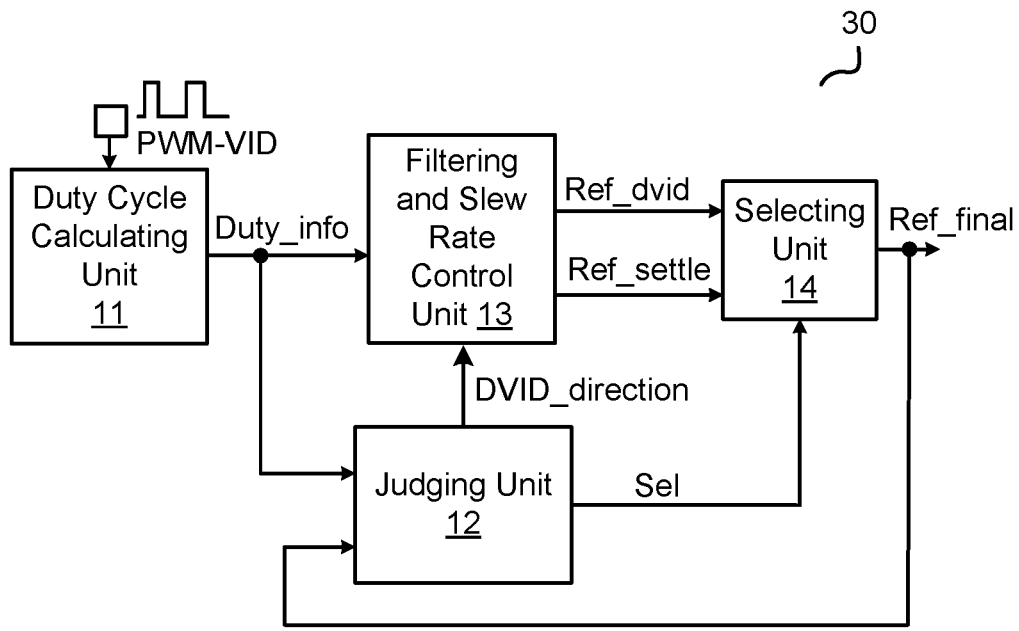
FIG. 3 schematically illustrates a reference generating circuit 30 according to one embodiment of the present invention.

FIG. 3 schematically illustrates reference generating circuit 30 according to one embodiment of the present invention. Reference generating circuit 30 comprises a duty cycle calculating unit 11, a judging unit 12, a filtering and slew rate control unit 13, and a selecting unit 14. Duty cycle calculating unit 11 is configured to receive voltage identification code PWM-VID, and provide duty signal Duty_info via measuring duty cycle Duty of the pulse width modulation signal. Filtering and slew rate control unit 13 is configured to receive duty signal Duty_info, provide a dynamic signal Ref_dvid via filtering duty signal Duty_info by a first function f1(Duty_info), and provide a static signal Ref_settle via filtering duty signal Duty_info by a second function f2(Duty_info). Judging unit 12 is configured to receive duty signal Duty_info and reference signal Ref_final, and is configured to provide a selection signal Sel based on duty signal Duty_info and reference signal Ref_final to judge status of reference signal Ref_final. In one embodiment, status of reference signal Ref_final comprises: dynamic increasing, dynamic decreasing and static regulation. In one embodiment, when judging unit 12 judges that reference signal Ref_final demands dynamic increasing or dynamic decreasing, reference generating circuit 30 is configured to provide reference signal Ref_final based on dynamic signal Ref_dvid; and when reference signal Ref_final is in the range determined by target voltage Vtarget_cal, judging unit 12 judges that reference signal Ref_final demands static regulation, and reference generating circuit 30 is configured to provide reference signal Ref_final based on static signal Ref_settle. Selecting unit 14 is configured to receive dynamic signal Ref_dvid, static signal Ref_settle, and selection signal Sel, and in response to selection signal Sel, selecting unit 14 is configured to provide reference signal Ref_final selectively based on one of dynamic signal Ref_dvid and static signal Ref_settle. In one embodiment, judging unit 12 is further configured to provide a direction signal DVID_direction to indicate a regulation direction of reference signal Ref_final.

Figure 4A:
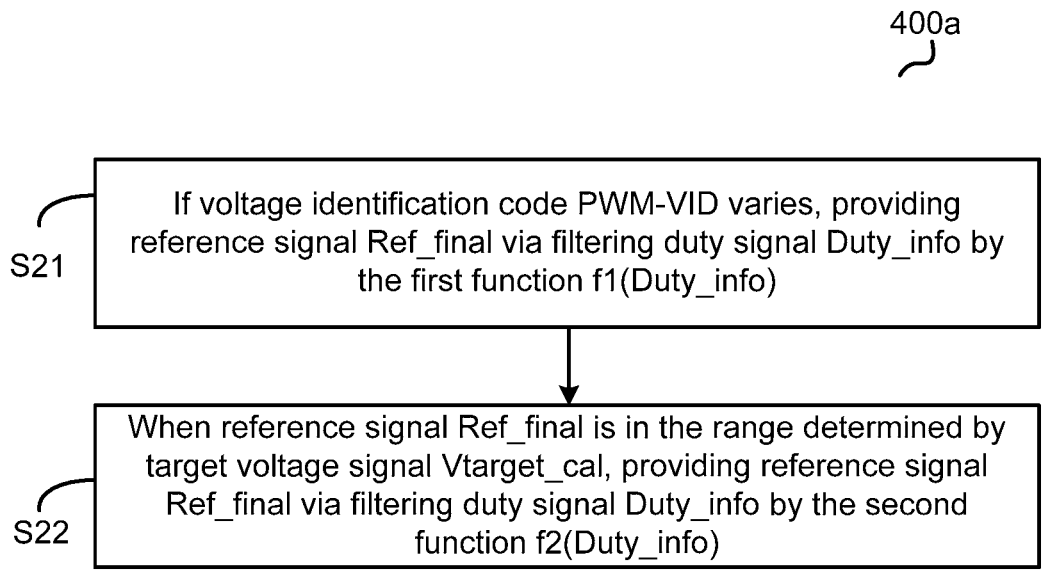
FIG. 4a shows flow chart 400a illustrating a method for generating the reference signal according to an embodiment of the present invention.
Figure 4B:
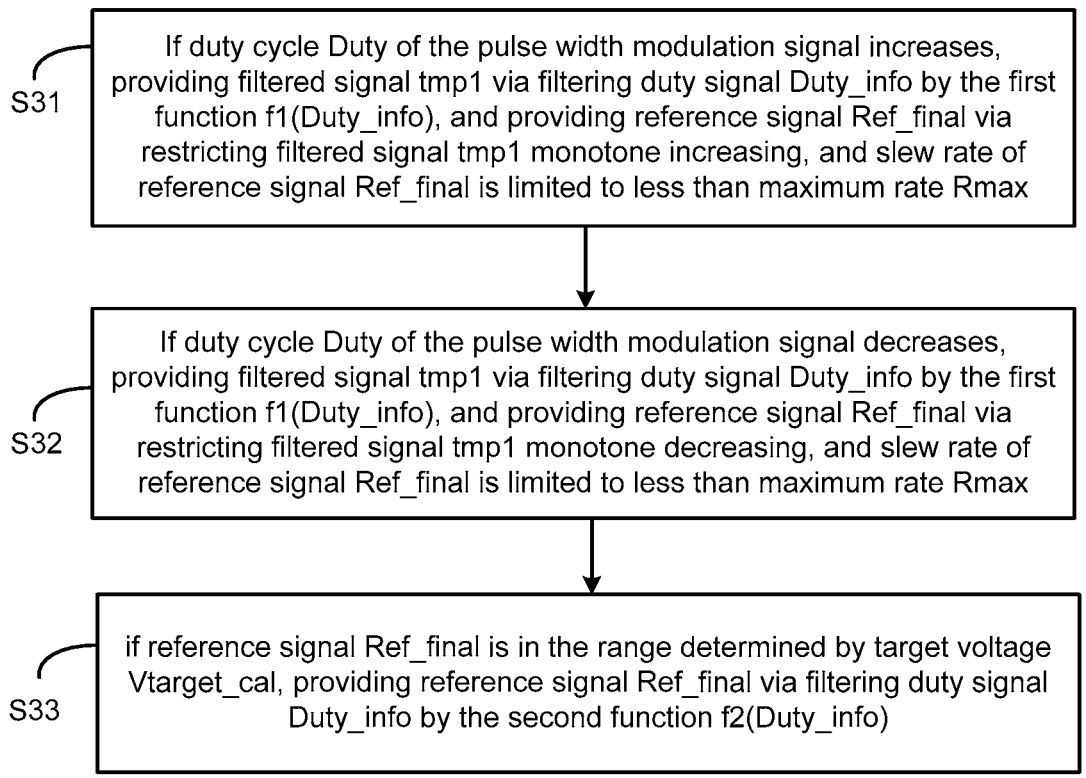
FIG. 4b shows flow chart 400b illustrating a method for generating a reference signal according to an embodiment of the present invention.

FIG. 4a-4b shows flow chart 400a-400b illustrating methods for generating reference signal Ref_final according to embodiments of the present invention.

The method illustrated by flow chart 400a comprises steps S21-S22.

At step S21, if voltage identification code PWM-VID varies, i.e., duty cycle Duty of the pulse width modulation signal increases or decreases, providing reference signal Ref_final via filtering duty signal Duty_info by the first function f1(Duty_info).

At step S22, when reference signal Ref_final is in the range determined by target voltage Vtarget_cal, providing reference signal Ref_final via filtering duty signal Duty_info by the second function f2(Duty_info). In one embodiment, an initial value of the second function f2(Duty_info) equals reference signal Ref_final when transits to the second function f2(Duty_info) from the first function f1(Duty_info).

In one embodiment, if duty cycle Duty of the pulse width modulation signal increases, filtering duty signal Duty_info by the first function f1(Duty_info) comprises: reference signal Ref_final linearly increases to the range determined by target voltage Vtarget_cal with preset maximum rate Rmax, e.g., reference signal Ref_final linearly increases to larger than the sum of target voltage Vtarget_cal and rising threshold up_threshold. In one embodiment, if duty cycle Duty of the pulse width modulation signal decreases, filtering duty signal Duty_info by the first function f1(Duty_info) comprises: reference signal Ref_final linearly decreases to the range determined by target voltage Vtarget_cal with preset maximum rate Rmax, e.g., reference signal Ref_final decreases to less than the sum of target voltage Vtarget_cal and falling threshold down_threshold.

The method illustrated by flow chart 400b comprises steps S31-S33.

At step S31, if duty cycle Duty of the pulse width modulation signal increases, providing filtered signal tmp1 via filtering duty signal Duty_info by the first function f1(Duty_info), and providing reference signal Ref_final via restricting filtered signal tmp1 increasing or keeping its value without decreasing, and slew rate of reference signal Ref_final is limited to less than maximum rate Rmax. In one embodiment, reference signal Ref_final equals filtered signal tmp1 when filtered signal tmp1 is larger than reference signal Ref_final, and reference signal Ref_final keeps its value when filtered signal tmp1 is less than reference signal Ref_final.

In one embodiment, f1(Duty_info) may be implement in a digital system as equations (3) and (4) shown:

$$\text{Ref\_filt}(n) = (V\text{max} - V\text{min}) * \text{Duty\_info}(n) + V\text{min} \quad (3)$$

$$\text{tmp1}(n) = (1-k1) * \text{Ref\_final}(n-1) + k2 * \text{Ref\_filt}(n) + k3 * \text{Ref\_filt}(n-1) \quad (4)$$

Where k1-k3 are filtering coefficients, n represents a current calculating period of the digital system, and n−1 represents a previous calculating period of the digital system.

In one embodiment, different coefficients k1-k3 lead to different time constant for reference signal Ref_final. In another embodiment, different filtering algorithm also lead to different time constant for reference signal Ref_final. In this invention, "time constant" is associated with a response time period of reference signal Ref_final. For example, time constant is a time period that reference signal Ref_final varies to (1−1/e) times of a predicted variation range, i.e., about 0.63 times of the predicted variation range.

In one embodiment, if duty cycle Duty of the pulse width modulation signal increases, providing filtered signal tmp1 further comprises filtering the sum of duty signal Duty_info and a compensation signal CMP, that is tmp1= f1(Duty_info+CMP), which can be implemented as equations (4) and (5) shown in the digital system as one example.

$$\text{Ref\_filt}(n) = (V\text{max} - V\text{min}) * [\text{Duty\_info}(n) + \text{CMP}] + V\text{min} \quad (5)$$

At step S32, if duty cycle Duty of the pulse width modulation signal decreases, providing filtered signal tmp1 via filtering duty signal Duty_info by the first function f1(Duty_info), and providing reference signal Ref_final via restricting filtered signal tmp1 decreasing or keeping its value without increasing, and slew rate of reference signal Ref_final is limited to less than maximum rate Rmax. In one embodiment, reference signal Ref_final equals filtered signal tmp1 when filtered signal tmp1 is less than reference signal Ref_final, and reference signal Ref_final keeps its value when filtered signal tmp1 is larger than reference signal Ref_final.

At step S33, if reference signal Ref_final is in the range determined by target voltage Vtarget_cal, that is duty cycle Duty of the pulse width modulation signal maintains, providing reference signal Ref_final via filtering duty signal Duty_info by the second function f2(Duty_info).

In one embodiment, the second function f2(Duty_info) may be implemented as equations (3) and (6) shown in the digital system.

$$\text{Ref\_final}(n) = (1-k4)*\text{Ref\_final}(n-1) + k5*\text{Ref\_filt}(n) + k6*\text{Ref\_filt}(n-1) + k7*\text{Ref\_filt}(n-2) \quad (6)$$

Where K4-k7 are filtering coefficients.

When filtering duty signal Duty_info by a traditional filter, ripple of reference signal Ref_final is large. Ripple of reference signal Ref_final increases during fast transient response, as a result, power loss increases. The method providing reference signal Ref_final proposed by this invention avoids ripple of reference signal Ref_final during dynamic increasing and dynamic decreasing, as a result, power loss is reduced, and efficiency is improved.

Figure 5:
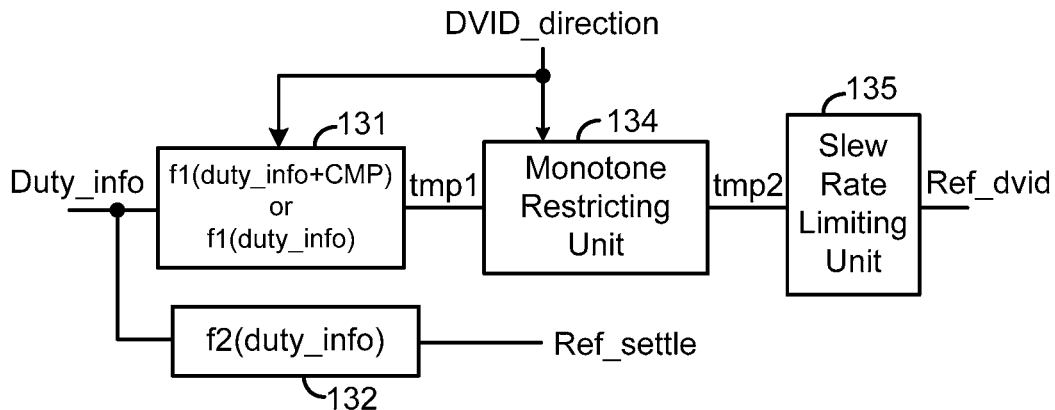
FIG. 5 schematically illustrates a filtering and slew rate control unit 13 according to an embodiment of the present invention.

FIG. 5 schematically illustrates filtering and slew rate control unit 13 according to an embodiment of the present invention. As shown in FIG. 5, filtering and slew rate control unit 13 comprises a filtering unit 131, a filtering unit 132, a monotone restricting unit 134, and a slew rate limiting unit 135. Filtering unit 131 receives duty signal Duty_info and direction signal DVID_direction, and provides filtered signal tmp1 via filtering duty signal Duty_info with the first function f1(Duty_info). In one embodiment, when direction signal DVID_direction indicates that the regulation direction of reference signal Ref_final is increasing, filtering unit 131 provides filtered signal tmp1 via filtering the sum of duty signal Duty_info and compensation signal CMP with the first function f1, that is tmp1=f1(Duty_info+CMP). In one embodiment, when direction signal DVID_direction indicates that the regulation direction of reference signal Ref_final is decreasing, filtering unit 131 provides filtered signal tmp1 via filtering duty signal Duty_info by the first function f1(Duty_info). Filtering unit 132 receives duty signal Duty_info, and provides static signal Ref_settle via filtering duty signal Duty_info by the second function f2(Duty_info). Monotone restricting unit 134 receives filtered signal tmp1 and direction signal DVID_direction, and provides monotone signal tmp2 via restricting filtered signal tmp1 based on direction signal DVID_direction. In one embodiment, when direction signal DVID_direction indicates that the regulation direction of reference signal Ref_final is decreasing, monotone signal tmp2 is provided by restricting filtered signal tmp1 monotone decreasing. In one embodiment, when direction signal DVID_direction indicates that the regulation direction of reference signal Ref_final is increasing, monotone signal tmp2 is provided by restricting filtered signal tmp1 monotone increasing. Slew rate limiting unit 135 receives monotone signal tmp2, and provides dynamic signal Ref_dvid via limiting slew rate of monotone signal tmp2 no more than maximum rate Rmax.

Figure 6:
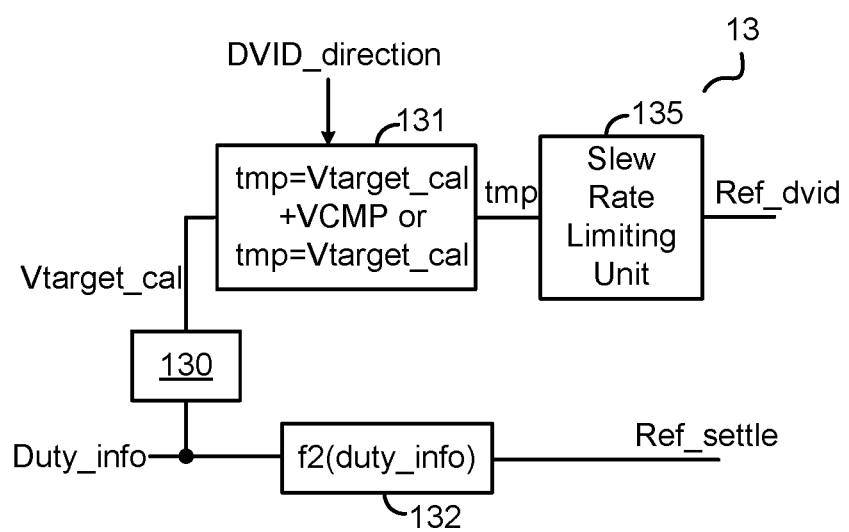
FIG. 6 schematically illustrates a filtering and slew rate control unit 13 according to another embodiment of the present invention.

FIG. 6 schematically illustrates a filtering and slew rate control unit 13 according to another embodiment of the present invention. In the embodiment shown in FIG. 6, filtering and slew rate control unit 13 comprises a calculating unit 130, filtering unit 131, filtering unit 132 and slew rate limiting unit 135. Calculating unit 130 receives duty signal Duty_info, and provides target voltage Vtarget_cal based on equation (2) illustrated above. Filtering unit 131 receives target voltage Vtarget_cal and direction signal DVID_direction, and provides filtered signal tmp. In one embodiment, when direction signal DVID_direction indicates that the regulation direction of reference signal Ref_final is increasing, filtered signal tmp equals the sum of target voltage Vtarget_cal and a compasation signal VCMP. In one embodiment, when direction signal DVID_direction indicates that the regulation direction of reference signal Ref_final is decreasing, filtered signal tmp equals target voltage Vtarget_cal.

Slew rate limiting unit 135 receives filtered signal tmp and provides dynamic signal Ref_dvid via limiting slew rate of filtered signal tmp to no more than maximum rate Rmax.

Filtering unit 132 receives duty signal Duty_info, and provides static signal Ref_settle via filtering duty signal Duty_info by the second function f2(Duty_info).

Figure 7:
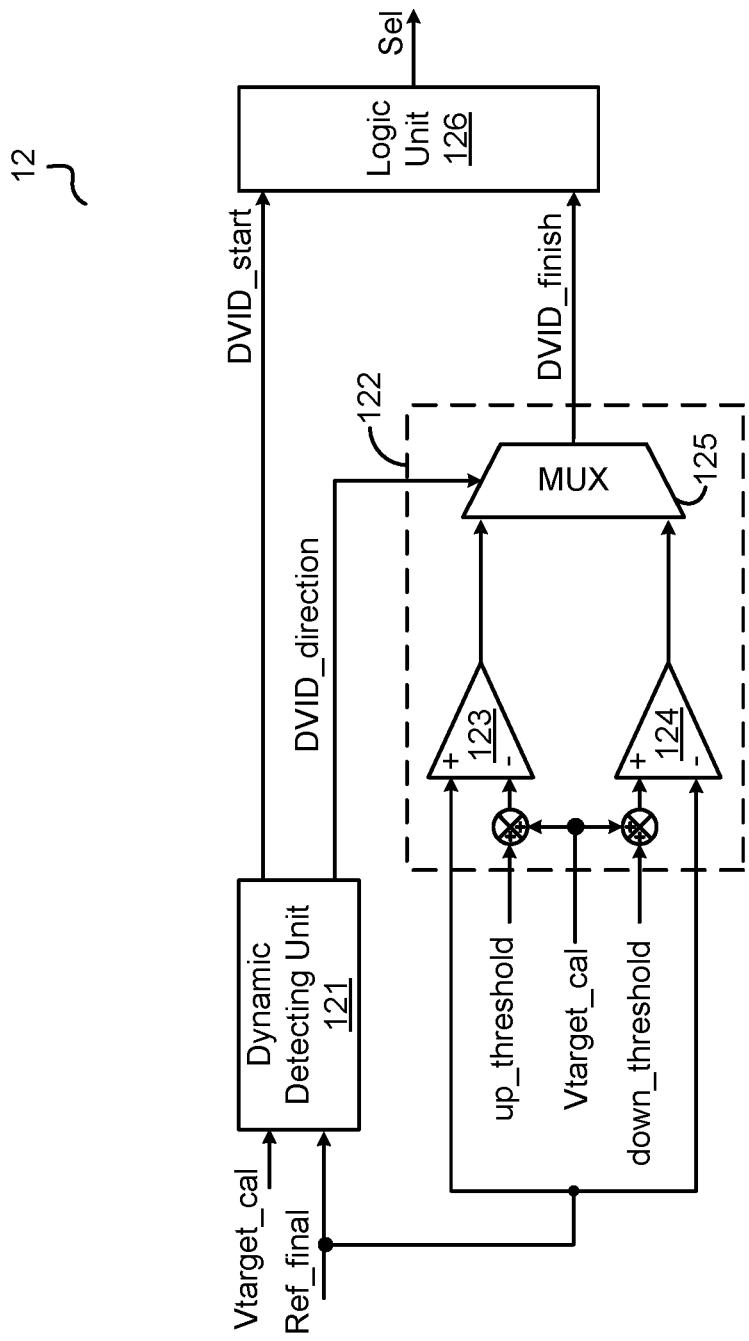
FIG. 7 schematically illustrates a judging unit 12 according to an embodiment of the present invention.

FIG. 7 schematically illustrates judging unit 12 according to an embodiment of the present invention. Judging unit 12 comprises a dynamic detecting unit 121, a static detecting unit 122 and a logic unit 126.

Dynamic detecting unit 121 judges if voltage identification code PWM-VID varies, i.e., if reference signal Ref_final demands dynamic regulation and provides dynamic start signal DVID_start based on target voltage Vtarget and reference signal Ref_final. Dynamic detecting unit 121 further judges the regulation direction of reference signal Ref_final and provides direction signal DVID_direction based on target voltage Vtarget_cal and reference signal Ref_final. In one embodiment, when the difference between target voltage Vtarget_cal and reference signal Ref_final is larger than preset value E1, dynamic start signal DVID_start indicates that voltage identification code PWM-VID varies and reference signal Ref_final demands dynamic regulation. In one embodiment, when target voltage Vtarget_cal is larger than reference signal Ref_final, direction signal DVID_direction indicates that the regulation direction of reference signal Ref_final is increasing. In one embodiment, when target voltage Vtarget_cal is less than reference signal Ref_final, direction signal DVID_direction indicates the regulation direction of reference signal Ref_final is decreasing.

Static detecting unit 122 judges if reference signal Ref_final is in the range determined by target voltage Vtarget_cal and provides dynamic finish signal DVID_finish based on target voltage Vtarget_cal and reference signal Ref_final. In one embodiment, when direction signal DVID_direction indicates that the regulation direction of reference signal Ref_final is increasing, and when reference signal Ref_final is larger than the sum of target voltage Vtarget_cal and rising threshold up_threshold, dynamic finish signal DVID_finish indicates that reference signal Ref_final is in the range determined by target voltage Vtarget_cal, dynamic regulation of reference signal Ref_final finished. In one embodiment, when direction signal DVID_direction indicates that the regulation direction of reference signal Ref_final is decreasing, and when reference signal Ref_final is less than the sum of target voltage Vtarget_cal and falling threshold down_threshold, dynamic finish signal DVID_finish indicates that reference signal Ref_final is in the range determined by target voltage Vtarget_cal, dynamic regulation of reference signal Ref_final finished. In the embodiment shown in FIG. 7, static detecting unit 122 comprises a comparison unit 123, a comparison unit 124, and a multiplexer 125. Comparison unit 123 compares the sum of target voltage Vtarget_cal and rising threshold up_threshold with reference signal Ref_final, comparison unit 124 compares the sum of target voltage Vtarget_cal and falling threshold down_threshold with reference signal Ref_final, and multiplexer 125 is configured to select one of a comparison result of comparison unit 123 and a comparison result of comparison unit 124 based on direction signal DVID_direction.

Logic unit 126 provides selection signal Sel based on dynamic start signal DVID_start and dynamic finish signal DVID_finish. In one embodiment, when dynamic finish signal DVID_finish indicates that reference signal Ref_final is in the range determined by target voltage Vtarget_cal, reference signal Ref_final transits to static regulation, and selecting unit 14 shown in FIG. 3 selects static signal Ref_settle as reference signal Ref_final. In one embodiment, when dynamic start signal DVID_start indicates that voltage identification code PWM-VID varies and reference signal Ref_final demands dynamic regulation, reference signal Ref_final transits to dynamic regulation, and selecting unit 14 shown in FIG. 3 selects dynamic signal Ref_dvid as reference signal Ref_final.

Figure 8:
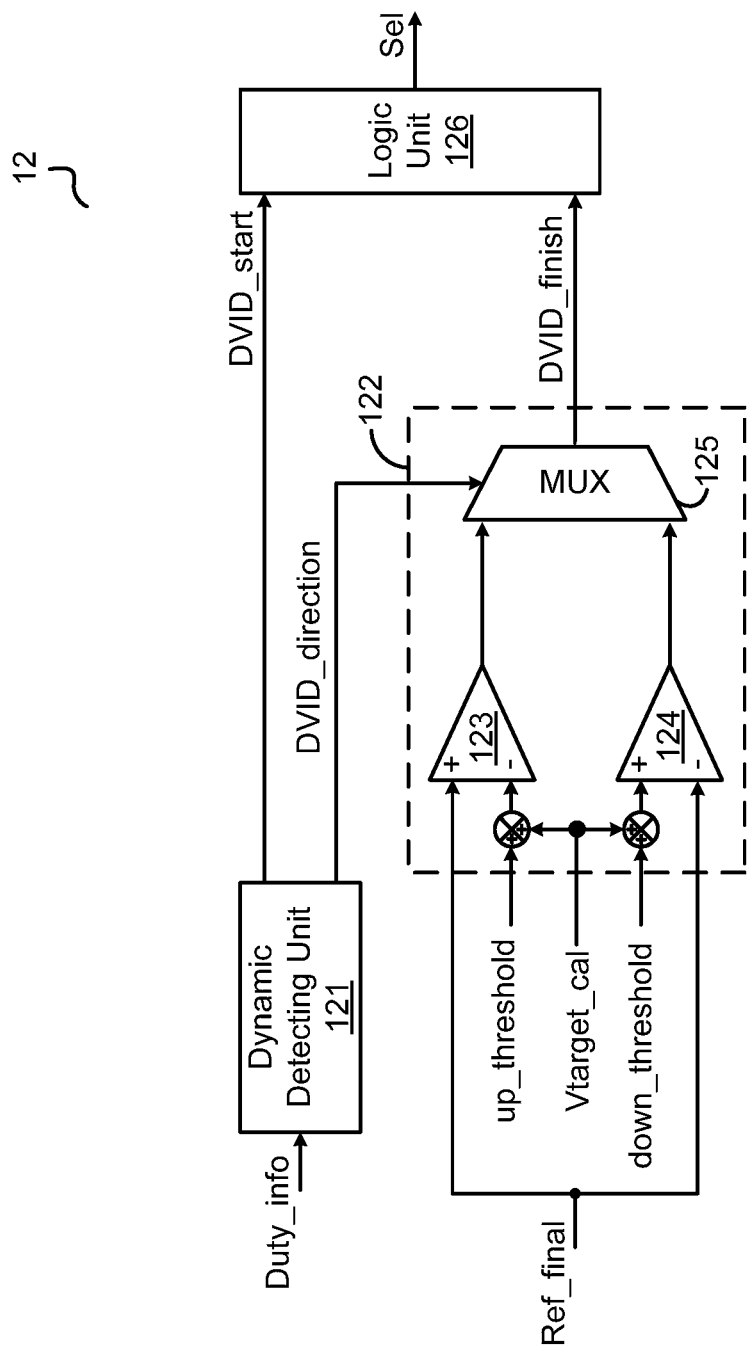
FIG. 8 schematically illustrates a judging unit 12 according to another embodiment of the present invention.

FIG. 8 schematically illustrates judging unit 12 according to another embodiment of the present invention.

In the embodiment shown in FIG. 8, dynamic detecting unit 121 judges if voltage identification code PWM-VID varies and if reference signal Ref_final demands dynamic regulation based on duty signal Duty_info and provides dynamic start signal DVID_start. Dynamic detecting unit 121 further judges the regulation direction of reference signal Ref_final and provides direction signal DVID_direction. In one embodiment, when variation of duty signal Duty_info exceeds the predetermined range, dynamic start signal DVID_start indicates that voltage identification code PWM-VID varies and reference signal Ref_final demands dynamic regulation. When duty signal Duty_info increases, direction signal DVID_direction indicates that the regulation direction of reference signal Ref_final is increasing; and when duty signal Duty_info decreases, direction signal DVID_direction indicates that the regulation direction of reference signal Ref_final is decreasing.

Figure 9:
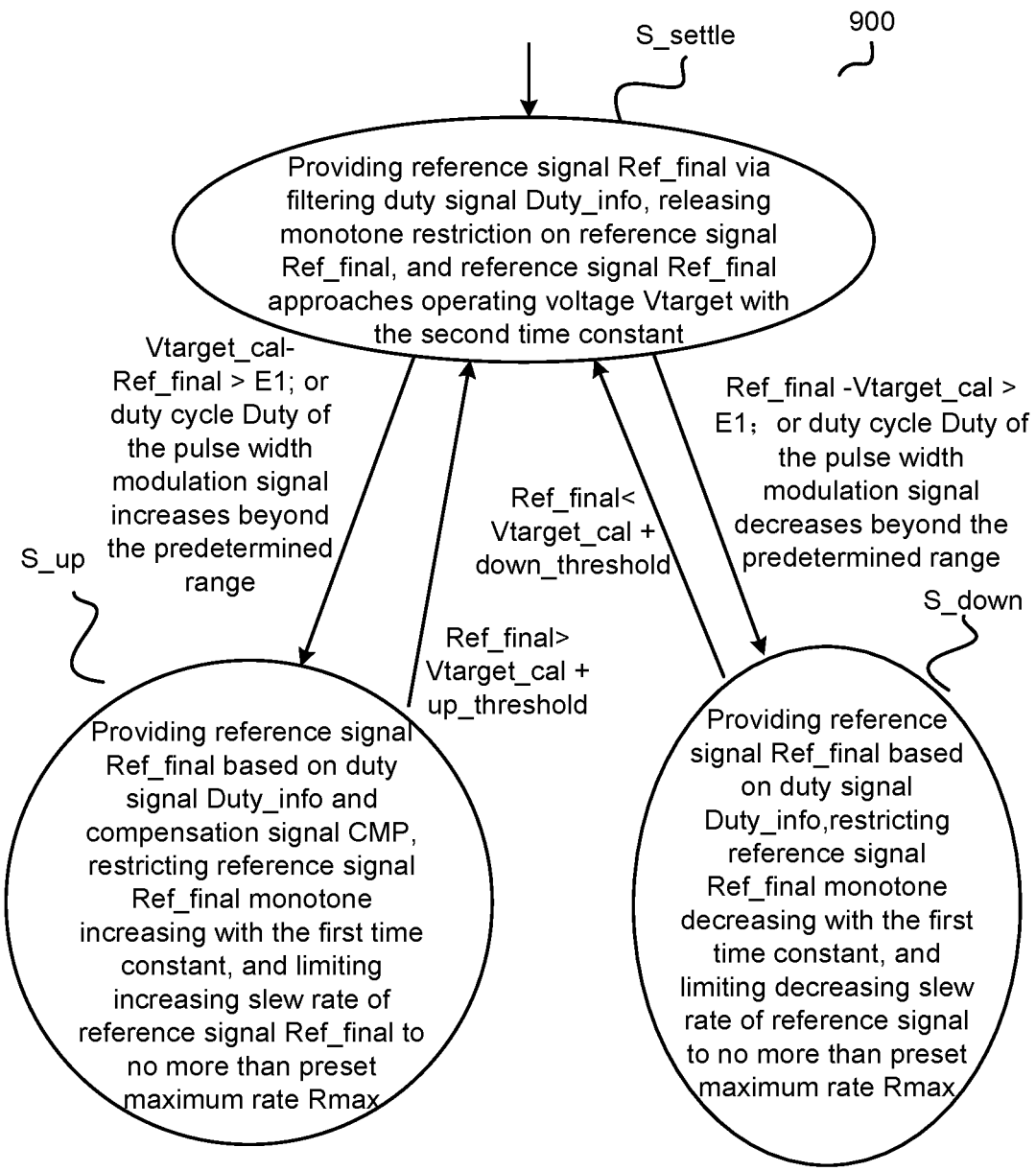
FIG. 9 shows a state transition diagram 900 of reference generating circuit 30 according to an embodiment of the present invention.

FIG. 9 shows a state transition diagram 900 of reference generating circuit 30 according to an embodiment of the present invention. In the embodiment shown in FIG. 9, reference generating circuit 30 has three states: a static regulation state S_settle, a dynamic increasing state S_up, and a dynamic decreasing state S_down. In one embodiment, reference generating circuit 30 enters static regulation state S_settle initially. When target voltage Vtarget_cal minus reference signal Ref_final is larger than preset value E1, or when duty cycle Duty of the pulse width modulation signal increases beyond the predetermined range, it is judged that duty cycle Duty of the pulse width modulation signal increase, reference signal Ref_final demands dynamic increasing regulation, and reference generating circuit 30 enters dynamic increasing state S_up from static regulation state S_settle. When reference signal Ref_final minus target voltage Vtarget_cal is larger than preset value E1, or when duty cycle Duty of the pulse width modulation signal decreases beyond the predetermined range, it is judged that duty cycle Duty of the pulse width modulation signal decrease, reference signal Ref_final demands dynamic decreasing regulation, and reference generating circuit 30 enters dynamic decreasing state S_down from static regulation state S_settle. In dynamic increasing state S_up, when reference signal Ref_final is in the range predetermined by target voltage Vtarget_cal, for example, when reference signal Ref_final is larger than the sum of target voltage Vtarget_cal and rising threshold up_threshold, reference generating circuit 30 transits to static regulation state S_settle from dynamic increasing state S_up. In dynamic decreasing state S_down, when reference signal Ref_final is in the range determined by target voltage Vtarget_cal, for example, when reference signal Ref_final is less than the sum of target voltage Vtarget_cal and down threshold down_threshold, reference generating circuit 30 transits to static regulation state S_settle from dynamic decreasing state S_down.

In one embodiment, dynamic increasing state S_up comprises: providing reference signal Ref_final based on duty signal Duty_info and compensation signal CMP, restricting reference signal Ref_final monotone increasing with the first time constant, and limiting increasing slew rate of reference signal Ref_final to no more than maximum rate Rmax. In one embodiment, dynamic decreasing state S_down comprises: providing reference signal Ref_final based on duty signal Duty_info, restricting reference signal Ref_final monotone decreasing, and limiting decreasing slew rate of reference signal Ref_final to no more than maximum rare Rmax. In one embodiment, static regulation state S_settle comprises: providing reference signal Ref_final via filtering duty signal Duty_info, releasing monotone restriction on reference signal Ref_final, and reference signal Ref_final approaches operating voltage Vtarget of the processor with the second time constant. Where the second time constant is larger than the first time constant.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

We claim:

1. A method for controlling a voltage regulator, wherein the voltage regulator is configured to provide an output voltage based on a reference signal, the method comprising:
   receiving a voltage identification code, the voltage identification code comprising a pulse width modulation signal;
   providing a duty signal via measuring a duty cycle of the pulse width modulation signal;
   calculating a target voltage corresponding to the voltage identification code based on the duty signal;
   providing the reference signal based on the duty signal and the target voltage; and
   providing a switching control signal to control the voltage regulator based on the reference signal and a feedback signal representative of the output voltage; wherein when the duty cycle of the pulse width modulation signal increases, restricting the reference signal to vary without decreasing unless the reference signal is in a range determined by the target voltage; and wherein when the duty cycle of the pulse width modulation signal decreases, restricting the reference signal to vary without increasing unless the reference signal is in the range determined by the target voltage.

2. The method of claim 1, wherein providing the reference signal based on the duty signal and the target voltage further comprises:
providing the reference signal via filtering the duty signal by a first function when the voltage identification code varies; and providing the reference signal via filtering the duty signal by a second function when the reference signal is in the range determined by the target voltage.

3. The method of claim 1, wherein:
the reference signal linearly increases with a preset maximum rate when the duty cycle of the pulse width modulation signal increases; and
the reference signal linearly decreases with the preset maximum rate when the duty cycle of the pulse width modulation signal decreases.

4. The method of claim 1, wherein providing the reference signal based on the duty signal and the target signal comprises:
when the duty cycle of the pulse width modulation signal increases, then providing a filtered signal via filtering the duty signal by a first function, and providing the reference signal based on the filtered signal, wherein the reference signal equals the filtered signal when the filtered signal is larger than the reference signal, and the reference signal keeps its value when the filtered signal is less than the reference signal;
when the duty cycle of the pulse width modulation signal decreases, then providing the filtered signal via filtering the duty signal by a first function, and providing the reference signal based on the filtered signal, wherein the reference signal equals the filtered signal when the filtered signal is less than the reference signal, and the reference signal keeps its value when the filtered signal is larger than the reference signal; and
when the duty cycle of the pulse width modulation signal maintains, then providing the reference signal via filtering the duty signal by a second function; and
a slew rate of the reference signal is limited to less than or equal to a preset maximum rate.

5. The method of claim 1, wherein:
when the reference signal minus the target voltage is larger than a preset value, then it is judged that the duty cycle of the pulse width modulation signal decreases.

6. The method of claim 1, wherein:
when the target voltage minus the reference signal is larger than a preset value, then it is judged that the duty cycle of the pulse width modulation signal increases.

7. The method of claim 1, wherein:
it is judged that the duty cycle of the pulse width modulation signal decreases when decreasing of the duty cycle of the pulse width modulation signal exceeds a preset range; and
it is judged that the duty cycle of the pulse width modulation signal increases when increasing of the duty cycle of the pulse width modulation signal exceeds the preset range.

8. A control circuit for a voltage regulator, wherein the voltage regulator is configured to provide an output voltage based on a reference signal, the control circuit comprising:
a reference generating circuit, configured to receive a voltage identification code and provide the reference signal based on the voltage identification code, wherein the voltage identification code comprises a pulse width modulation signal, and wherein when a duty cycle of the pulse width modulation signal increases, restricting the reference signal to vary without decreasing, and when the duty cycle of the pulse width modulation signal decreases, restricting the reference signal to vary without increasing; and
a switching control circuit, configured to provide a switching control signal to control the voltage regulator based on the reference signal and a feedback signal representative of the output voltage.

9. The control circuit of claim 8, wherein a target voltage is calculated based on the duty cycle of the pulse width modulation signal.

10. The control circuit of claim 9, wherein:
when the reference signal is in a range determined by the target voltage, the reference generating circuit is configured to stop restricting the reference signal from varying without decreasing, or stop restricting the reference signal from varying without increasing.

11. The control circuit of claim 8, wherein the reference generating circuit further comprises:
a duty cycle calculating unit, configured to provide a duty signal via measuring the duty cycle of the pulse width modulation signal; and
a filtering and slew rate control unit, configured to receive the duty signal, and configured to provide a dynamic signal via filtering the duty signal by a first function, and to provide a static signal via filtering the duty signal by a second function; wherein
when the duty cycle of the pulse width modulation signal is judged as increasing or decreasing, the reference generating circuit is configured to provide the reference signal based on the dynamic signal; and wherein
when the reference signal is in a range determined by a target voltage corresponding to the voltage identification code, the reference generating circuit is configured to provide the reference signal based on the static signal.

12. The control circuit of claim 11, wherein the filtering and slew rate control unit further comprises:
a first filter, configured to provide a filtered signal via filtering the duty signal by the first function; and
a second filter, configured to provide the static signal via filtering the duty signal by the second function.

13. The control circuit of claim 12, wherein:
when the duty cycle of the pulse width modulation signal increases, the filtering and slew rate control unit is configured to provide the dynamic signal based on the filtered signal, wherein a slew rate of the filtered signal is limited to less than or equal to a preset maximum rate.

14. The control circuit of claim 12, wherein:
when the duty cycle of the pulse width modulation signal decreases, the filtering and slew rate control unit is configured to provide the dynamic signal based on the filtered signal, wherein a slew rate of the filtered signal is limited to less than or equal to a preset maximum rate.

15. A method for controlling a voltage regulator, wherein the voltage regulator has a power switch and the voltage regulator is configured to provide an output voltage based on a reference signal, the method comprising:
receiving a voltage identification code, the voltage identification code comprising a pulse width modulation signal;
providing a duty signal via measuring a duty cycle of the pulse width modulation signal;
calculating a target voltage corresponding to the voltage identification code based on the duty signal;

providing the reference signal based on the duty signal and the target voltage, wherein providing the reference signal via filtering the duty signal by a first function when the voltage identification code varies, and providing the reference signal via filtering the duty signal by a second function when the reference signal is in a range determined by the target voltage; and providing a switching control signal to control the power switch based on the reference signal and a feedback signal representative of the output voltage.

16. The method of claim 15, wherein when the target voltage minus the reference signal is larger than a preset value, keeping the reference signal monotone increasing unless the reference signal is larger than the sum of the target voltage and a rising threshold, wherein the rising threshold is larger than or equal to zero.

17. The method of claim 15, wherein when the reference signal minus the target voltage is larger than a preset value, keeping the reference signal monotone decreasing unless the reference signal is less than the sum of the target voltage and a falling threshold, wherein the falling threshold is larger than or equal to zero.

18. The method of claim 15, wherein when the duty cycle of the pulse width modulation signal increases, providing a filtered signal based on the duty signal, and wherein the reference signal equals the filtered signal when the filtered signal is larger than the reference signal, and the reference signal keeps its value when the filtered signal is less than the reference signal.

19. The method of claim 15, wherein when the duty cycle of the pulse width modulation signal decreases, providing a filtered signal based on the duty signal, and wherein the reference signal equals the filtered signal when the filtered signal is less than the reference signal, and the reference signal keeps its value when the filtered signal is larger than the reference signal.

* * * * *